United States Patent
Yang

(10) Patent No.: US 11,445,550 B2
(45) Date of Patent: Sep. 13, 2022

(54) METHOD OF TRANSMITTING RANDOM ACCESS RESPONSE MESSAGE, METHOD OF RECEIVING RANDOM ACCESS RESPONSE MESSAGE AND DEVICES THEREOF

(71) Applicant: VIVO MOBILE COMMUNICATION CO., LTD., Guangdong (CN)

(72) Inventor: Xiaodong Yang, Chang'an Dongguan (CN)

(73) Assignee: VIVO MOBILE COMMUNICATION CO., LTD., Chang'an Dongguan (CN)

(*) Notice: Subject to any disclaimer, the term of this patent is extended or adjusted under 35 U.S.C. 154(b) by 50 days.

(21) Appl. No.: 16/610,810

(22) PCT Filed: May 2, 2018

(86) PCT No.: PCT/CN2018/085346
§ 371 (c)(1),
(2) Date: Nov. 4, 2019

(87) PCT Pub. No.: WO2018/202042
PCT Pub. Date: Nov. 8, 2018

(65) Prior Publication Data
US 2020/0077447 A1 Mar. 5, 2020

(30) Foreign Application Priority Data
May 5, 2017 (CN) .......................... 201710314222.4

(51) Int. Cl.
*H04W 4/00* (2018.01)
*H04W 74/08* (2009.01)
(Continued)

(52) U.S. Cl.
CPC ... *H04W 74/0833* (2013.01); *H04W 56/0045* (2013.01); *H04W 72/0446* (2013.01); *H04W 74/006* (2013.01)

(58) Field of Classification Search
CPC ......... H04W 74/0833; H04W 56/0045; H04W 72/0446; H04W 74/006
See application file for complete search history.

(56) References Cited

U.S. PATENT DOCUMENTS

2010/0195640 A1* 8/2010 Park .................. H04W 56/0005
370/350
2010/0260136 A1 10/2010 Fan et al.
(Continued)

FOREIGN PATENT DOCUMENTS

CN 101873713 A 10/2010
CN 102106181 A 6/2011
(Continued)

OTHER PUBLICATIONS

3GPP TSG RAN WG2 #60bis, Jan. 14-18, 2008, R2-080176 (Year: 2008).*
(Continued)

*Primary Examiner* — Siren Wei
(74) *Attorney, Agent, or Firm* — Maschoff Brennan

(57) ABSTRACT

A method of transmitting a random access response message, a method of receiving a random access response message and devices thereof are provided. The method of transmitting a random access response message includes: receiving a random access request sent by a UE, and returning a first message to the UE, where the first message carries a random access response (RAR) message and RAR format indication information, the RAR format indication information is at least partially set in the RAR message, or the RAR format indication information is entirely set outside
(Continued)

the RAR message; the RAR format indication information is configured to indicate a format of the RAR message.

19 Claims, 8 Drawing Sheets

(51) Int. Cl.
*H04W 56/00* (2009.01)
*H04W 72/04* (2009.01)
*H04W 74/00* (2009.01)

(56) References Cited

U.S. PATENT DOCUMENTS

| | | | |
|---|---|---|---|
| 2011/0170503 A1* | 7/2011 | Chun | H04W 74/006 |
| | | | 370/329 |
| 2012/0188947 A1* | 7/2012 | Larsson | H04W 52/346 |
| | | | 370/328 |
| 2012/0287865 A1 | 11/2012 | Wu et al. | |
| 2013/0083739 A1 | 4/2013 | Yamada | |
| 2014/0126520 A1* | 5/2014 | Quan | H04W 74/008 |
| | | | 370/329 |
| 2016/0100422 A1 | 4/2016 | Papasakellariou et al. | |
| 2016/0381715 A1* | 12/2016 | Lee | H04W 74/0841 |
| | | | 370/329 |
| 2017/0202053 A1* | 7/2017 | Rune | H04W 76/25 |
| 2018/0241511 A1* | 8/2018 | Harada | H04L 1/16 |

FOREIGN PATENT DOCUMENTS

| | | |
|---|---|---|
| CN | 102595626 A | 7/2012 |
| CN | 102595636 A | 7/2012 |
| CN | 102958073 A | 3/2013 |
| EP | 3 043 615 A1 | 7/2016 |

OTHER PUBLICATIONS

EP Search Report in Application No. 18795149.6 dated Mar. 12, 2020.
CN Office Action in Application No. 201710314222.4 dated May 15, 2019.
"Format for RACH message 2" 3GPP TSG RAN WG2 #60bis, Jan. 14, 2008.
"MAC Random Access Response Extension", 3GPP TSG-RAN WG2 #63, Aug. 18, 2008.
Written Opinion and International Search Report in Application No. PCT/CN2018/085346 dated Nov. 14, 2019.
Fujitsu, "Discussion on RAR in NR", 3GPPTSG RAN WG1 NR Ad-Hoc Meeting, R1-1700654, Jan. 9, 2017, Section 2.

* cited by examiner

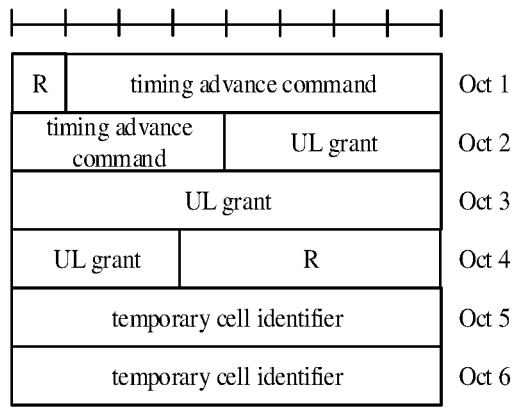

FIG. 5

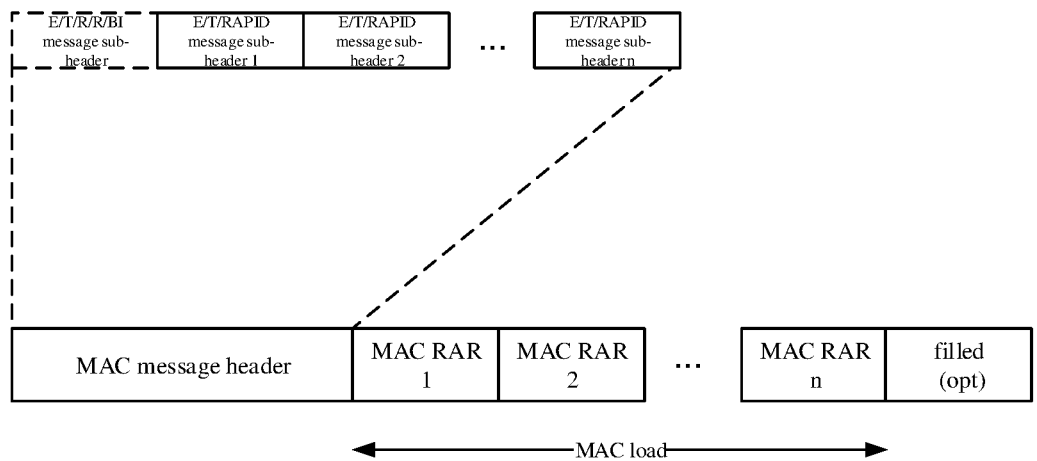

FIG. 6 receiving a random access request sent by a UE, and returning a first message to the UE, where the first message carries a random access response (RAR) message and RAR format indication information, the RAR format indication information is at least partially set in the RAR message, or the RAR format indication information is entirely set outside the RAR message; the RAR format indication information is configured to indicate a format of the RAR message — S101

FIG. 7

METHOD OF TRANSMITTING RANDOM ACCESS RESPONSE MESSAGE, METHOD OF RECEIVING RANDOM ACCESS RESPONSE MESSAGE AND DEVICES THEREOF

CROSS-REFERENCE TO RELATED APPLICATION

This application is the U.S. national phase of PCT Application PCT/CN2018/085346 filed on May 2, 2018, which claims a priority to Chinese Patent Application No. 201710314222.4 filed in China on May 5, 2017, the disclosure of which is incorporated herein in its entirety by reference.

TECHNICAL FIELD

The present disclosure relates to communication technologies, and in particular, relates to a method of transmitting a random access response message, a method of receiving a random access response message and devices thereof.

BACKGROUND

The fifth generation (5G) wireless network is also known as the fifth generation mobile phone mobile communication standard, which is an extension of the 4G. The 5G wireless networks can increase the transmission speed of signaling by using high carrier frequencies and unprecedented number of antennas. In addition, 5G can be combined with any potential new 5G air interface, LTE and WiFi to provide universal high coverage and a seamless user experience. 5G's wireless access New Radio (NR) is a new OFDM-based 5G wireless air interface standard. Similar to Long Term Evolution (LTE), it needs to achieve a plurality of purposes by supporting random access of UEs.

Currently, the Random Access Channel (RACH) of the NR may be divided into a contention random access and a non-contention random access. The random access procedure of the competition is shown in FIG. 1 as four steps of the message 1 to the message 4. The non-contention random access process only needs to access the message 1 and the message 2 in two steps as shown in FIG. 2. It is not difficult to see that the eNB side needs to send a Random Access Response (RAR) message to the UE after receiving the Random Access Preamble (RAP) request reported by the UE, whether it is a contention or a non-contention random access.

FIG. 3, FIG. 4 and FIG. 5 show several formats supported by the current RAR message transmission. However, in the process of implementing the embodiments of the present disclosure, the inventors have found that the network side in the related art determines the format of the RAR message to be sent to the UE based on the preamble code in the message 1 of the RACH. As shown in FIG. 6, when the base station side decides to send the RAR message to the UE, the RAR messages of a plurality of UEs having the same format are cascaded and delivered together. It is not difficult to understand that the RAR message delivery mode is inflexible. When the format of the RAR information corresponding to a plurality of UEs to be sent are different, the base station side has to send a plurality of pieces of RAR information for different RAR formats, so as to enable the UE side to perform the decoding successfully in a unified RAR format, which not only increases the workload of the base station, but also wastes air interface resources.

SUMMARY

A method of transmitting a random access response message, a method of receiving a random access response message and devices thereof are provided in the present disclosure, to solve the technical issues in the related art that the RAR message transmission mode is inflexible, the message sent to a plurality of UEs can only include the RAR message of the same format, which increases the workload of the base station and wastes the air interface resources.

In a first aspect, a method of transmitting a random access response message is provided in some embodiments of the present disclosure, including:

receiving a random access request sent by a UE, and returning a first message to the UE, where the first message carries a random access response (RAR) message and RAR format indication information, the RAR format indication information is at least partially set in the RAR message, or the RAR format indication information is entirely set outside the RAR message; the RAR format indication information is configured to indicate a format of the RAR message.

In a second aspect, a method of receiving a random access response message is provided in some embodiments of the present disclosure, including:

receiving a first message returned by a network side after sending a random access request, where the first message carries a random access response (RAR) message and RAR format indication information, the RAR format indication information is at least partially set in the RAR message, or the RAR format indication information is entirely set outside the RAR message, and the RAR format indication information is configured to indicate a format of the RAR message; and decoding the RAR message based on a format indicated by the RAR format indication information.

In a third aspect, a device of transmitting a random access response message is provided in some embodiments of the present disclosure, including:

a first communication unit, configured to receive a random access request sent by a UE, and returning a first message to the UE, where the first message carries a random access response (RAR) message and RAR format indication information, the RAR format indication information is at least partially set in the RAR message, or the RAR format indication information is entirely set outside the RAR message; the RAR format indication information is configured to indicate a format of the RAR message.

In a fourth aspect, a device of receiving a random access response message is provided in some embodiments of the present disclosure, including:

a second communication unit, configured to receive a first message returned by a network side after sending a random access request, where the first message carries a random access response (RAR) message and RAR format indication information, the RAR format indication information is at least partially set in the RAR message, or the RAR format indication information is entirely set outside the RAR message, and the RAR format indication information is configured to indicate a format of the RAR message; and a decoding unit, configured to decode the RAR message based on a format indicated by the RAR format indication information.

In a fifth aspect, a device of transmitting a random access response message is provided in some embodiments of the present disclosure, including: a memory, a processor and a computer program stored in the memory and executable by the processor, where the processor executes the computer program to perform the method of transmitting a random access response message hereinabove.

In a sixth aspect, a computer-readable storage medium is provided in some embodiments of the present disclosure, where a computer program is stored in the computer-readable storage medium, the computer program is executed by a processor to perform the method of transmitting a random access response message hereinabove.

In a seventh aspect, a device of receiving a random access response message is provided in some embodiments of the present disclosure, including: a memory, a processor and a computer program stored in the memory and executable by the processor, where the processor executes the computer program to perform the method of receiving a random access response message hereinabove.

In an eighth aspect, a computer-readable storage medium, where a computer program is stored in the computer-readable storage medium, the computer program is executed by a processor to perform the method of receiving a random access response message hereinabove.

According to the method of transmitting a random access response message, the method of receiving a random access response message and devices thereof, in the method of transmitting a random access response message, the network side device (e.g., the base station), after receiving the RAP request sent by the UE, may send a first message to the UE, where the first message includes RAR format indication information configured to indicate the format of the corresponding RAR message, to enable the UE, after receiving the RAR message, to decode and identify the RAR message according to the format indicated by the RAR message format indication information. Compared with the RAR message sending method in the related art, the sent message in the embodiment of the present disclosure includes indication information indicating the format of each RAR message, and when it is used in the scenario that the RAR messages are sent to a plurality of UEs at the same time, the UE is able to decode and identify the RAR messages successfully and the RAR messages of different formats may be integrated into a single message and delivered to each UE, thereby effectively reducing the workload of the base station side and saving air interface resources.

BRIEF DESCRIPTION OF THE DRAWINGS

Various other advantages and benefits will become apparent to those skilled in the art from the detailed descriptions below. The drawings are only to illustrate the some embodiments and are not to limit the present disclosure. Throughout the drawings, the same reference numerals are used to refer to the same parts.

FIG. 5 is a schematic view of another RAR sub-information format in the prior art;

FIG. 6 is a schematic view of a RAR information format in the prior art;

FIG. 7 is a flowchart of a method of sending an RAR message in some embodiments of the present disclosure;

DETAILED DESCRIPTION

Figure 1:
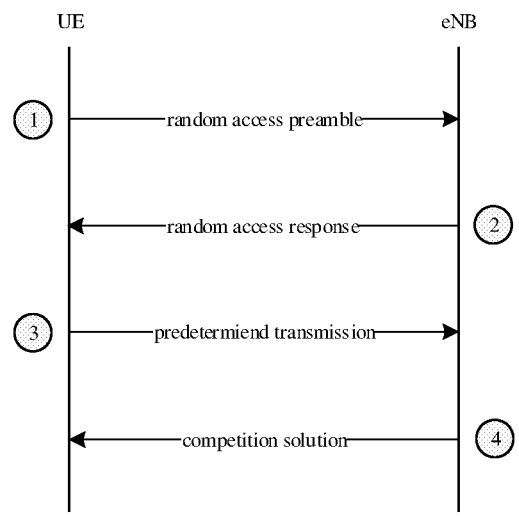
FIG. 1 is a schematic view of an interaction of a contention random access signaling in NR random access in the prior art.
Figure 2:
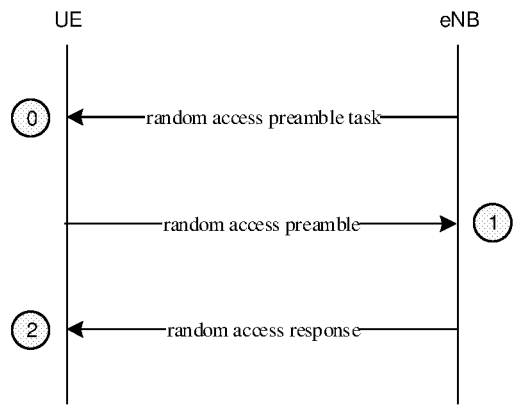
FIG. 2 is a schematic view of an interaction of a non-contention random access signaling in NR random access in the prior art.

The technical solutions in the embodiments of the present disclosure will be described hereinafter clearly and completely with reference to the accompanying drawings of the embodiments of the present disclosure. Obviously, the embodiments described above are part of the embodiments of the present disclosure, not all of them. Based on the embodiments of the present disclosure, all other embodiments acquired by those ordinary skilled in the art without creative work will fall into the protection scope of the present disclosure.

In a first aspect, a method of transmitting a random access response message is provided in some embodiments of the present disclosure. As shown in FIG. 7, the method includes:

S101: receiving a random access request sent by a UE, and returning a first message to the UE.

The first message carries a random access response (RAR) message and RAR format indication information, the RAR format indication information is at least partially set in the RAR message, or the RAR format indication information is entirely set outside the RAR message; the RAR format indication information is configured to indicate a format of the RAR message.

According to the method of transmitting a random access response message, the network side device (e.g., the base station), after receiving the RAP request sent by the UE, may send a first message to the UE, where the first message includes RAR format indication information configured to indicate the format of the corresponding RAR message, to enable the UE, after receiving the RAR message, to decode and identify the RAR message according to the format indicated by the RAR message format indication information. Compared with the RAR message sending method in the related art, the sent message in the embodiment of the present disclosure includes indication information indicating the format of each RAR message, and when it is used in the scenario that the RAR messages are sent to a plurality of UEs at the same time, the UE is able to decode and identify the RAR messages successfully and the RAR messages of different formats may be integrated into a single message and delivered to each UE, thereby effectively reducing the workload of the base station side and saving air interface resources.

In practical applications, the number of UEs reporting RAP requests may be one or more. Correspondingly, when there is one UE reporting RAP requests, the network side device may only return the first message to the UE, and the first message may include only one RAR format indication information and one RAR message. When there are a plurality of UEs reporting RAP requests, the network side device may only return one first message to each UE, but the first message may include a plurality of RAR format indication information and a plurality of RAR messages.

In a specific implementation, the RAR message may include the RAR sub-message, and the RAR format indication information may include the sub-message format indication information which may indicate the format of the corresponding RAR sub-message.

In an actual application, the RAR message herein may further include a message sub-header corresponding to the RAR sub-message, that is, one RAR message may include a message sub-header and a corresponding RAR sub-message. Then, the sub-message format indication information may be carried in the corresponding message sub-header, and when the first message includes a plurality of RAR messages, in other words, the first message includes a plurality of message sub-headers and RAR sub-messages, each of the message sub-headers may carry a sub-message format indication information which is configured to indicate the format of the corresponding RAR sub-message. By the indication relationship between the sub-message format indication information and the RAR sub-message, the message sub-header including the sub-message format indication information may also establish a corresponding relationship with the RAR sub-message. Of course, the sub-message format indication information may also be in a field other than the sub-header of the message, for example, in a field adjacent to the message sub-header.

In a specific implementation, it can be understood that, in order to enable each UE to successfully receive the RAR sub-messages that need to be received, the message sub-header must include UE indication information that may establish a relationship with the UE. The UE indication information here may be implemented in many ways, and an optional implementation manner is introduced below:

It is well known to those skilled in the art that when the UE sends a RAP request, the preamble code reported by the UE is carried in the RAP request, and the preamble code has a one-to-one correspondence with each UE. Correspondingly, the preamble code information may be included in the message sub-header, and the message sub-header may establish a corresponding relationship with the UE by using the preamble code information. The preamble code information may be the preamble code itself or the identifier of the preamble code. The preamble code identifier is configured to indicate the correspondence between the message sub-header and the preamble code reported by the UE. For example, it is assumed that both the UE1 and the network side agree that the symbol "1" indicates the Preamble code "123456", and both the UE2 and the network side agree that the symbol "0" indicates the Preamble code "234567". When the UE1 reports the Preamble code "123456" and the UE2 reports the Preamble code "234567", the preamble code information of the message sub-header corresponding to the UE1 that is sent by the network side may carry only the symbol "1", and the preamble code information of the message sub-header corresponding to the UE2 that is sent by the network side may carry only the symbol "0". The advantage is that the length of the message sub-header may be minimized, thereby avoiding the message sub-header from occupying too many air interface resource due to the too long preamble code.

It should be noted that the foregoing situation is only an optional implementation manner. In an actual application, other identifier information of the UE may be used instead of the preamble code identifier to indicate the correspondence between the UE and the message sub-header. For example, the ID of the UE, etc., and this is not limited in the embodiments of the present disclosure.

In the case that the message sub-header includes the sub-message format indication information and the preamble code information, in the specific implementation, the sub-message format indication information herein may be implemented in various manners, and accordingly, the message sub-header may also have a plurality of formats. One of some embodiments will be described in detail below.

Figure 8:
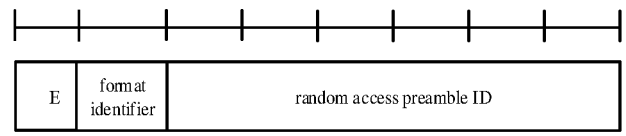
FIG. 8 is a schematic view of a message sub-header in some embodiments of the present disclosure; FIG.

Optionally, as shown in FIG. 8, the entire message sub-header includes an E field, a sub-message format indication field (Form at) and a random access preamble code ID field (RAPID) (i.e., the field in which the preamble code information is located). The E field occupies 1 bit and is configured to indicate whether there are other message sub-headers following this message sub-header in the first message. In the case that the E field is 1, it means that there is at least one following message sub-header. In the case that the E field is 0, it means that there is no following message sub-header. The Form at field identifies the format of the corresponding RAR sub-message. Since the Form at field here occupies 1 bit, the sub-message format indication field may represent at most two RAR sub-message formats. The RAPID field occupies 6 bits and is used to carry at least one preamble code information. When a plurality of UEs report a RAP message and the network side device sends a first message to a plurality of UEs, the network side device may carry the preamble code information corresponding to each UE in the message sub-header, so the UE may determine which sub-header is its corresponding message sub-header according to the preamble code information of the message sub-header, and then the UE may determine which RAR sub-message is be acquire and decoded according to the correspondence between the message sub-header and the RAR sub-message, thereby ensuring that RAR sub-message may be received correctly.

Figure 9:
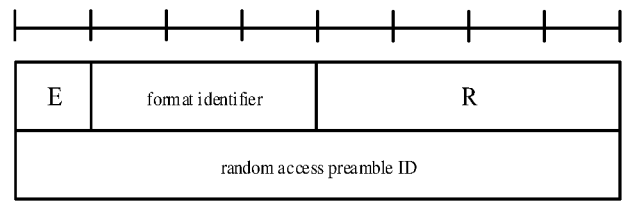
FIG. 9 is a schematic view of another message sub-header in some embodiments of the present disclosure.

Optionally, as shown in FIG. 9, the entire message sub-header includes an E field, a sub-message format indication field (Form at), an R field, and a random access preamble code ID field (RAPID). The E field here is the same as the previous embodiment, which occupies 1 bit and is configured to indicate whether there are other message sub-headers following this message sub-header. The Form at field is also configured to identify the format of the corresponding RAR sub-message. Since the Form at field occupies 3 bits, the Form at field may represent up to eight RAR sub-message formats. The RAPID field here is also configured to carry at least one preamble code information. In addition, the R field herein is a reserved field, and the R field may not carry information, or carry some information that needs to be sent to the UE as needed, which is not specifically limited in this embodiment of the present disclosure.

It can be understood that FIG. 8 and FIG. 9 are only two implementation manners of the message sub-header in the present disclosure, which is not limited to the above two methods in practical applications, and the format of the message sub-head may be modified as needed. For example, the bit occupied by the Form at field may be set according to the number of format types of the RAR sub-message. For example, when there are 10 RAR message formats in total, the Form at field may be set to 4 bits. Of course, in order to save bandwidth resources, the number of bits of the Form at field herein does not need to be set too large, as long as satisfying the identifications of all the types of formats, generally it can be set to meet the minimum bit numbers that identify all the types of formats.

Whether to set the R field and how to arrange every field here may also be set according to the actual situation. For example, in the case that the RAPID field requires at least 6 bits, then when the Form at field occupies more than one bit, it is obvious that a byte bit cannot contain the E field, the Form at field, and the RAPID field at the same time, so in the byte, the bits other than the E field and the Form at field are set to the reserved field R field, and the RAPID field is set in the next byte. In the case that the RAPID field contains a plurality of preamble codes corresponding to the UE, a plurality of bytes may be required to carry the field, which is not specifically limited in this embodiment of the present disclosure.

In addition, a special implementation of the message sub-header will be described. It has been described hereinabove that the preamble code information in the message header may include at least one preamble code information. When only one preamble code information is included, it means that the UE, the message sub-header, and the RAR sub-message have a one-to-one correspondence. When a plurality of preamble code information is included, it is not difficult to understand at this time that when a plurality of UEs perform the identification, some of the UEs may find the same message sub-header, however one message sub-header corresponds to one RAR sub-message. Therefore, in this case, actually the same RAR sub-message is delivered to a plurality of UEs. This situation is generally applied in a scenario of delivering to the UEs by groups.

For example, it is assumed that there are a total of 10 UEs reporting RAP messages, in which a RAR sub-message with a format code of 001 needs to be delivered to the UE1-UE3, a RAR sub-message with a format code of 010 is delivered to the UE4-UE8, and a RAR sub-message with a format code of 011 is delivered to the UE9-UE10. Then, the first message at this time may include three message sub-headers and three RAR sub-messages. The first message sub-header includes three preamble codes corresponding to the UE1-UE3, and the sub-message format indication is 001, the first RAR sub-message is a sub-message with the format code 001. The second message sub-header includes five preamble codes corresponding to the UE4-UE8, and the sub-message format indication is 010, the second RAR sub-message is a sub-message with the format code 010. The third message sub-header includes two preamble codes corresponding to the UE9-UE10, and the sub-message format indication is 011, and the third RAR sub-message is a sub-message with format code 011. Therefore, in this manner, the RAR sub-message of the three formats may be delivered to the groups in the UE1-UE10, thereby reducing the length of the data transmitted during the transmission by groups and saving the air interface resource.

In a specific implementation, the RAR sub-message may also have a plurality of different implementation manners based on different actual situations. Two optional embodiments are described in detail below.

(1) The UE has no uplink data to report

At present, the random access in the 5G-NR in the related art may support the following events: 1. supporting an initial RRC idle (idle state) UE to connect to the network; 2. supporting RRC reestablishment of the UE; 3. supporting the UE to perform cell switching; 4. supporting the UE to request an uplink synchronization when the downlink data arrives at the UE but the uplink is out of synchronization; 5. the uplink data arrives but the uplink is out of synchronization; 6. supporting the UE to switch from the inactive state to the active state; 7. supporting the uplink synchronization acquisition of Scell. It can be seen from FIG. 3 to FIG. 5 that the RAR sub-message in the related art includes an uplink grant field (UL grant) configured to indicate to the UE the uplink resource allocation result allocated to the UE by the base station.

However, in the process of implementing the embodiments of the present disclosure, the inventors have found that, according to the events supported by the NR random access, not all the random access purposes based on the RACH access need to request the scheduling of the uplink resources. For example, the fourth event here is "downlink data arrives but uplink is out of synchronization, UE requests an uplink synchronization" and the seventh event "supporting the uplink synchronization acquisition of Scell". In these two cases, the UE performs the random access only for the uplink synchronization without requesting the uplink resource scheduling. For the UE that reports such request, no matter which type of RAR message is applied by the base station, the UL grant field may be included in the RAR sub-message sent to such UE. Then, after receiving such RAR sub-message, the UE has to report the uplink data to the base station according to the uplink resource allocation result indicated in the UL grant field. However, actually the data does not need to be reported, so the uplink data does not contain any substantial information. Obviously, such reporting process of the UE is meaningless and wastes the air interface resources significantly.

Based on this, the method of transmitting the RAR message in some embodiments of the present disclosure may further include:

S101': in the case that it is determined based on the random access request sent by the UE that a random access of the UE does not require an uplink grant, not carrying an uplink grant resource in the RAR sub-message corresponding to the UE.

Figure 10:
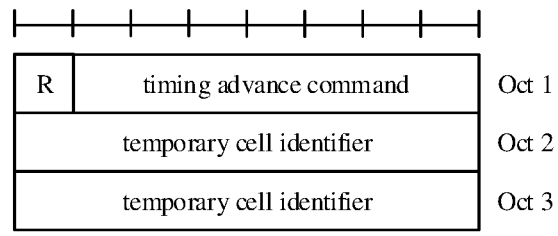
FIG. 10 is a schematic view of a RAR sub-message in some embodiments of the present disclosure.

Specifically, the network side device receives the RAP request reported by each UE. In the case that it is determined based on the RAP request reported by the UE that a random access of the UE does not require an uplink grant, i.e., no uplink data needs to be sent, for example, as described hereinabove, the UE is only requesting an uplink synchronization at this time, and the uplink grant resource is not carried in the RAR sub-message corresponding to the UE, that is, the RAR sub-message may not include the UL grant field, and the network-side device sends the first message carrying such RAR sub-message to each UE. FIG. 10 illustrates an embodiment of a RAR sub-message that does not include a UL grant field, where the RAR sub-message carries only the reserved field R, the timing advance command field and the temporary cell identifier field (Temporary C-RNTI). After receiving the first message including such a sub-message, the UE may search for a corresponding RAR sub-message according to the message sub-header. Since the UL grant field is not decoded when the RAR sub-message is decoded, there is no need to report the uplink data without substantial content to the network side device, thereby saving air interface resources.

It should be noted that FIG. 10 is only a specific implementation manner. In practical applications, the arrangement of and the number of bits respectively occupied by the time advance command field, the temporary cell identifier field and the R field may be set according to actual needs, as long as the RAR sub-message does not contain a UL grant field and contains the necessary fields required by other UEs.

(2) The network side device needs to send other necessary control messages to the UE.

It can be understood that the network side device frequently sends various types of control messages to the UE, such as a power control message for controlling the transmitting power of UE. In the related art, generally the power control message is sent to the UE by the network side device independently, and those skilled in the art always intend to save the air interface resource as much as possible. In view of this, the method of transmitting the RAR message in some embodiments of the present disclosure may further include:

S101": carrying power control information in the RAR sub-message, where the power control information is configured to enable the UE to acquire, based on the power control information, a transmitting power of transmitting uplink information.

Figure 11:
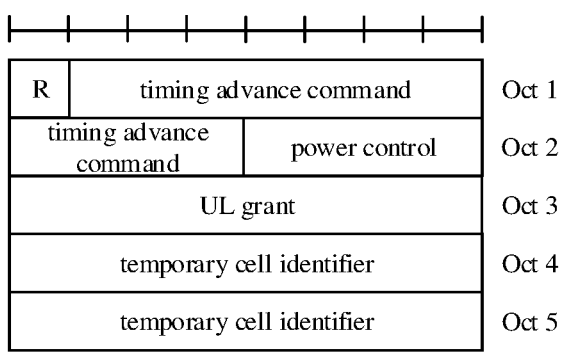
FIG. 11 is a schematic view of another RAR sub-message in some embodiments of the present disclosure.

FIG. 11 illustrates an embodiment of a RAR sub-message carrying power control information. The power control information is carried in the power control field following the timing advance command field. Compared with the RAR sub-message format in the related art shown in FIG. 3 to FIG. 5, the power control field occupies a part of the original UL grant field. In this way, the network side device side may simultaneously send the RAR sub-message and the power control message to the UE based on one RAR sub-message in the first message, instead of sending the power control message separately, thereby effectively saving the air interface resource. After receiving such RAR sub-message, the UE may decode the power control field and acquire the transmitting power for transmitting the uplink information according to the power control information in the power control field.

Further, since the UE has transmitted the RAP request in a certain power, the power control information herein may be a power change value increased or decreased relative to the power of transmitting the RAP. For example, 000 represents that the power is not changed, and 001 represents that the power is increased by 0.5 db. Of course, the power control information may also be the absolute value of power.

It can be understood that, because the power control information is the control information for controlling the transmitting power of the uplink information of the UE, the purpose of the UE accessing at this time is to upload data, and then the RAR sub-message delivered by network side device must include the UL grant field. The specific number of bits of the original UL grant occupied by the power control field and the specific number of bits of the UL grant occupied in the related art may be flexibly set according to the actual situation, which is not specifically limited in this embodiment of the present disclosure.

It can also be understood that the case of carrying the power control information is only a specific implementation manner of the RAR sub-message carrying the UE control message, and the person skilled in the art may also make adaptive improvement to the RAR sub-message according to actual needs. For example, another one or more UE control messages may be carried in the RAR sub-message, as long as the carried control message can be successfully received by the UE and the field carrying the message does not affect the necessary fields of other RAR sub-messages, the embodiment of the present disclosure does not specifically limit this.

In the foregoing, several implementations of the message sub-header and several implementations of the RAR sub-message are described. It can be understood that, in a specific implementation, the first message including a plurality of message sub-headers and a plurality of RAR sub-messages, i.e., including a plurality of RAR messages, may also be implemented in a various ways.

Figure 12:
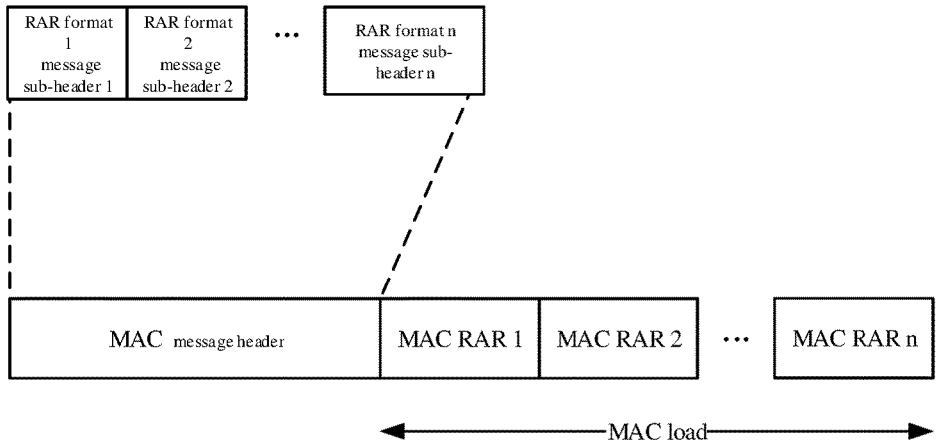
FIG. 12 is a schematic view of a RAR message in some embodiments of the present disclosure.

Optionally, as shown in FIG. 12, the first message includes a message header and a message payload, where the message header includes a plurality of message sub-headers arranged in a preset order. For example, as shown in FIG. 12, the formats of the RAR sub-messages identified by message sub-header 1, message sub-header 2, . . . and message sub-header n may be the same or different. The message payload may include a plurality of RAR sub-messages that are also sequentially arranged in the preset order, such as RAR sub-message 1, RAR sub-message 2 . . . and RAR sub-message n shown in FIG. 12. It is not difficult to understand that the order of the message sub-headers may be in one-to-one correspondence to the order of the RAR sub-messages, that is, the message sub-header 1 corresponds to the RAR message 1, and the message sub-header 2 corresponds to the RAR message 2, and the message sub-header n corresponds to the RAR message n, so that the UE may quickly find the corresponding RAR sub-message according to the message sub-header.

Figure 13:
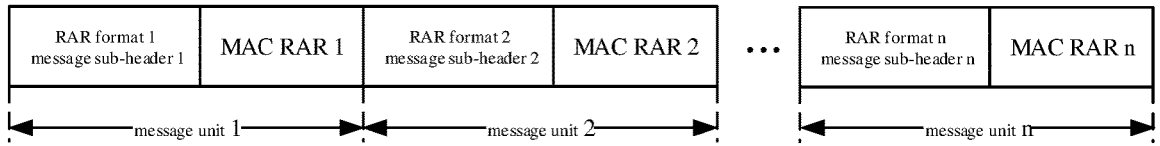
FIG. 13 is a schematic view of another RAR message in some embodiments of the present disclosure.

Optionally, as shown in FIG. 13, the first message includes a plurality of message units arranged in sequence, and each message unit may include one RAR message, that is, include a message sub-header and a RAR sub-message corresponding to the message sub-header. That is, the message sub-header 1 in the message unit 1 corresponds to the RAR message 1, the message sub-header 2 in the message unit 2 corresponds to the RAR message 2, and the message sub-header n in the message unit n corresponds to the RAR message n.

Of course, the message sub-header and the RAR sub-message in the first message may also be arranged in other ways, which is not specifically limited in the present disclosure.

According to the foregoing description, the message sub-header in the embodiment of the present disclosure also has various implementation manners. Therefore, in order to enable the UE that receives the first message to identify the format of each sub-header, in some embodiments of the present disclosure, the RAR format indication information may further include sub-head format indication information configured to indicate a format of the corresponding message sub-header.

In a specific implementation, the sub-header format indication information herein may be in a plurality of different forms. For example, the number of bits of the corresponding byte may be set according to the total number of types of sub-header formats. For example, when the total number of the types is 2, the length of the sub-head format indication information may be set to 1 bit, and 1 or 0 is configured to indicate different formats.

Figure 14:
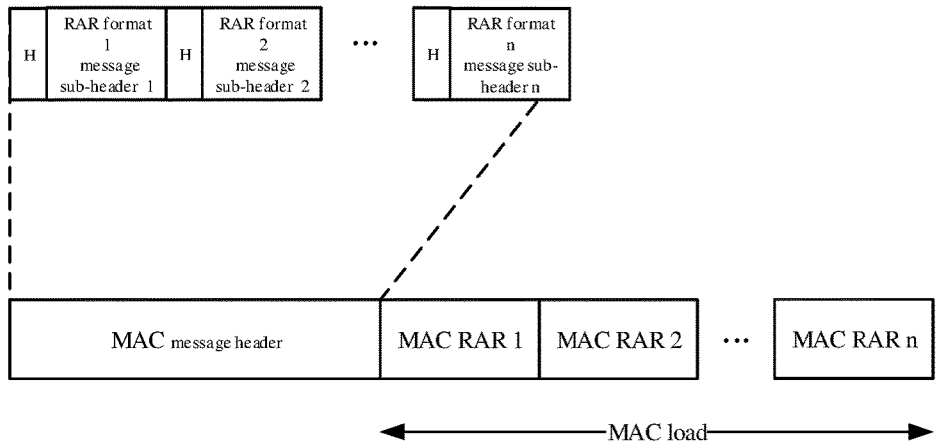
FIGS. 14(a) and 14(b) are schematic views of a structure of another RAR message in some embodiments of the present disclosure.
Figure 14:
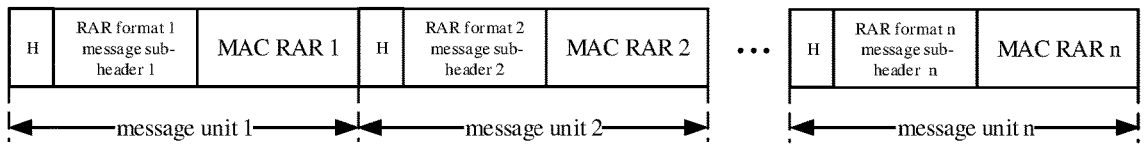

In the specific implementation, the sub-head format indication information herein may be set in a plurality of different locations. For example, referring to FIG. 14(*a*) and FIG. 14(*b*), the sub-head format indication information H may be set prior to and adjacent to a sub-header corresponding to each RAR sub-message, so that after the UE acquires the sub-head format indication information, the UE may learn the format corresponding to the sub-header and determine the number of bits occupied by the sub-header. Then, after the corresponding number of bits, the next sub-head format indication information H is acquire. This makes it possible to determine the format of each sub-header in sequence. For example, referring to FIG. 14(a) and FIG. 14(b), a bit field H may be set prior to the sub-header corresponding to each RAR sub-message, where the field H may be configured to indicate which kind of the two kinds of sub-headers the sub-head corresponding to the corresponding RAR sub-message belongs to.

It is not difficult to understand that the sub-message format indication information configured to indicate the RAR sub-message may also be in the same manner as the sub-header format indication information, that is, in a field prior to and adjacent to the sub-header. In this manner, the UE may, before acquiring the sub-header, obtain the format of the sub-header and the format of the corresponding RAR sub-message by acquiring the sub-header format indication message and the sub-message format indication message.

Optionally, the sub-head format indication information may be set in the same manner as the sub-message format indication field is set in FIG. 8, that is, the sub-head format indication information is set following the E field. In this way, the format of each sub-header may also be determined. In this case, the sub-head format indication information and the sub-message format indication information may be the same information.

According to method in the embodiment of the present disclosure, the sub-header format indication information indicating the format of the message sub-header is carried, so that even if the first message carries the sub-headers of different formats, the UE device may, after receiving the message, determine the format and length of the sub-header based on the sub-header format indication information, so as to be able to support the sub-headers of the plurality of sub-header formats in the first message.

It is to be understood that the above description of the embodiments is merely for the purpose of facilitating a better understanding of the method of the embodiments of the present disclosure and is not intended to limit the disclosure. Moreover, the various embodiments described above do not affect each other, and any combination of the various embodiments may fall within the scope of the present disclosure.

In summary, the method in some embodiments of the present disclosure provides a plurality of implementation manners of the first message and the message sub-header and the RAR sub-message thereof, so as to be able to adapt to various service environments in various communication environments, thereby significantly improving the expandability of the first message. It is not difficult to understand that, in order to enable the UE to receive and decode successfully, prior to S101, the method further includes:

S100: negotiating with the UE to configure a correspondence between the RAR format indication information and the format of the RAR message.

Specifically, for the negotiation of the format of the RAR sub-message, firstly the network-side device needs to configure the bit number occupied by the sub-message format indication field according to the total number of the format types of the RAR sub-message, and then determines, according to number of bits occupied by the sub-message format indication field, the format of the message sub-header. This determination process has been described in the foregoing and will not be described here. Then, the correspondence between the sub-message format indication fields and the formats of the RAR sub-message is set.

Figure 3:
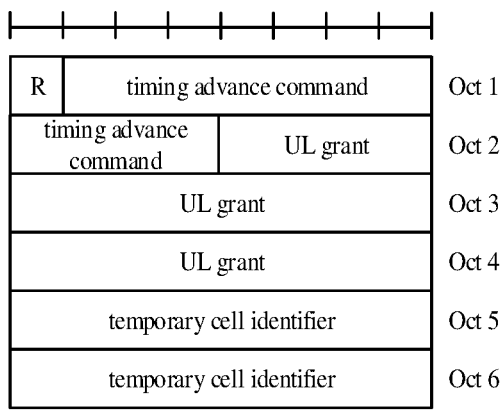
FIG. 3 is a schematic view of a RAR sub-information format in the prior art.
Figure 4:
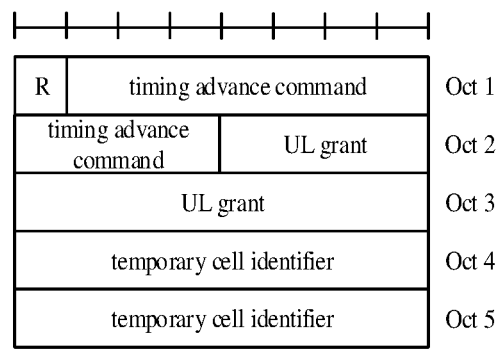
FIG. 4 is a schematic view of another RAR sub-information format in the prior art.

For example, in the case that the current RAR sub-message format has five types, which are the format styles shown in FIG. 3, FIG. 4, FIG. 5, FIG. 10 and FIG. 11, then the sub-message format indication field needs 3 bits to identify all types of formats. After the format field is set, the format style shown in FIG. 3 is represented by 000, the format style shown in FIG. 4 is represented by 001, the format style shown in FIG. 5 is represented by 010, the format style shown in FIG. 10 is represented by 011, and the format style shown in FIG. 11 is represented by 100.

Finally, the network-side device sends the configuration result to each UE, and the UE saves the configuration result locally after receiving the configuration result, so that the UE may successfully receive the first message in the manner of the prior negotiation, and learns the format information of the corresponding RAR sub-message according to the sub-message format indication information in the corresponding message sub-header, and finally decodes the RAR sub-message according to the corresponding pre-stored corresponding format style to obtain corresponding data. The process of negotiating the sub-header format is similar to the process of negotiating the format of the RAR sub-message, and details are not described herein again.

In addition, it should be noted that the method in the embodiment of the present disclosure can be applied not only to a 5G system but also to a system such as LTE.

Figure 15:
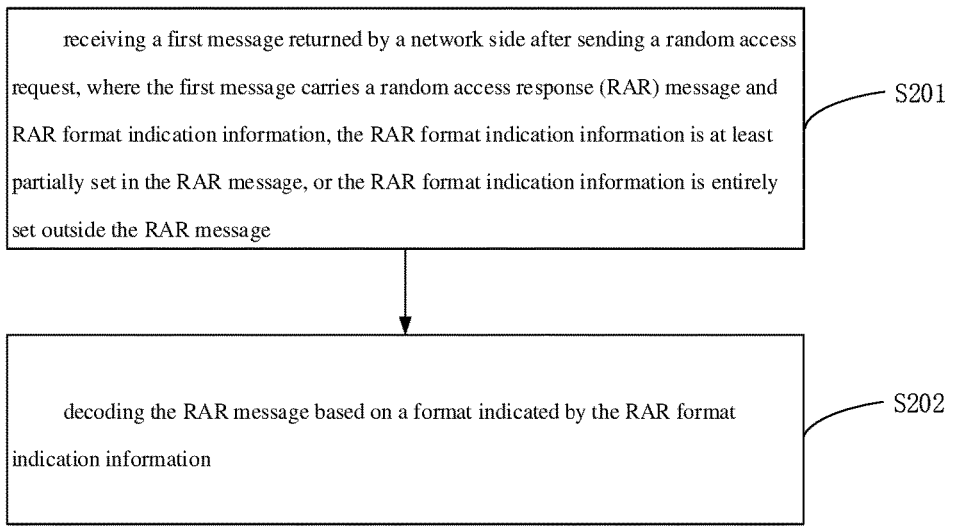
FIG. 15 is a flowchart of a method of receiving a RAR message in some embodiments of the present disclosure.

In a second aspect, a method of receiving a random access response message is provided in some embodiments of the present disclosure. As shown in FIG. 15, the method includes:

S201: receiving a first message returned by a network side after sending a random access request, where the first message carries a random access response (RAR) message and RAR format indication information, the RAR format indication information is at least partially set in the RAR message, or the RAR format indication information is entirely set outside the RAR message, and the RAR format indication information is configured to indicate a format of the RAR message; and S202: decoding the RAR message based on a format indicated by the RAR format indication information.

According to the method of receiving a random access response message in some embodiments of the present disclosure, after receiving the first message sent by the network side, the corresponding RAR message is decoded according to the format indicated by the format indication information, thereby reducing workload of the network side, saving the air interface resources and ensuring the normal and orderly decoding of RAR messages.

In a specific implementation, the RAR message may include a RAR sub-message, where the RAR format indication information may include sub-message format indication information configured to indicate a format of the corresponding RAR sub-message.

Correspondingly, S202 may be specifically:

S202': decoding the RAR sub-message based on a format indicated by the sub-message format indication information.

Further, in a specific implementation, the RAR message herein may further include a message sub-header, where the message sub-header corresponds to the RAR sub-message, and the sub-message format indication information may be carried in the corresponding message sub-header. In addition, the message sub-header may further include preamble code information, where the preamble code information may be the preamble code itself or the identifier of the preamble code. The preamble code is reported by the UE in the previous RAP request, and the preamble code information herein may also be a plurality of preamble code information, and then, for the UE, in the case that a certain message sub-header of the received first message includes a plurality of preamble code information, the UE may decode the corresponding RAR sub-message based on the sub-message format indication information in the certain message sub-header as long as the preamble code reported by the UE is matched with one of the plurality of preamble code information. In this embodiment, the detailed descriptions have been made in the foregoing are not described herein again.

Further, in the embodiment that the format indication information and the RAR message are as described above, optionally the S202' includes:

S202'a: acquiring preamble code information in a message sub-header in the RAR message;

S202'b: in the case that the information of the preamble is matched with the information of the preamble used in sending the random access request, decoding the corresponding RAR sub-message based on the format indicated by the sub-message format indication information in the message sub-header;

in the case that the information of the preamble is not matched with the information of the preamble used in sending the random access request, acquiring a length of the corresponding RAR sub-message based on the sub-message format indication information in the message sub-header, acquiring a starting position of the next RAR sub-message based on the length, and judging the information of the preamble in the next message sub-header;

That is, in the case that the first message contains a plurality of message sub-headers and a plurality of RAR sub-messages, when each UE receives the first message and looks for its corresponding message sub-header, each UE actually traverses all sub-headers prior to the sub-header. The reason is that the formats of the RAR sub-messages in the first message may be different, so the lengths of the RAR sub-messages may also be different, so the UE must know the starting position of the next RAR sub-message when it determines that the current sub-head does not match itself.

For example, it is assumed that the first message is arranged as shown in FIG. 12 and includes three message sub-headers and three RAR sub-messages. The formats of the three RAR sub-messages are different, and the lengths thereof are 6 bits, 8 bits and 10 bits, respectively. For a certain UE, the corresponding message sub-header is the third message sub-header, and the third RAR sub-message is to be decoded. Then for the UE, the process of finding the third RAR message is as follows:

First, the preamble code information in the first message sub-header is acquired. In the case that it is determined that it does not match itself, the sub-message format indication information in the first message sub-header is acquired, and then the UE learns that the length of the first RAR sub-message is 6 bits based on the correspondence between format identifiers and formats stored locally. It is not difficult to understand that the UE may know the starting position of the first RAR sub-message at this time (for the convenience of description, the starting position is the first bit), and the UE may know that the starting position of the second RAR sub-message is the seventh bit according to the length of the first RAR sub-message. Then, the preamble code information in the second message sub-header is acquired. In the case that it is determined that it does not match itself, the UE also acquires the sub-message format indication information in the second message sub-header, and learns that the length of the second RAR sub-message is 8 bits, and then UE may know that the starting position of the third RAR sub-message is the fifteenth bit. Then, after acquiring the third message sub-header and determining that it matches itself, the format code is also obtained, the format of the third RAR sub-message is obtained, and then the third RAR sub-message is decoded according to the locally pre-stored format from the fifteenth bit.

Similarly, the above-described search method is also applicable to the arrangement format of the first message shown in FIG. 13. However, as described in the foregoing, the format of each message sub-header in the method provided by the embodiment of the present disclosure is different. When the formats of the message sub-header carried by the first message are the same, the UE may know the format of the sub-header through the negotiation, so that the corresponding two RAR sub-messages may be directly found using the above two search methods. However, the first message may also carry a plurality of message sub-headers of different formats. In this case, the UE is also unable to know where to start the acquiring of each sub-header and in which format to decode each sub-header.

Therefore, the RAR format indication information may further include sub-head format indication information configured to indicate the format of the corresponding message sub-header, and the specific setting manner of the sub-head format indication information may be referred to the description of the sub-head format indication information in the first aspect. Further, S202 may further include:

S202: decoding the message sub-header based on a format indicated by the sub-header format indication information.

The specific decoding process may refer to the above-mentioned method of decoding the RAR sub-message.

For example, for the arrangement manner of the first message shown in FIG. 12, the UE may first acquire the sub-head format indication information of the first message sub-header to obtain the format of the first message sub-header, and then acquire the preamble code information according to the format. In the case that the preamble code information is matched, the RAR sub-message corresponding to the first message sub-header is directly searched; in the case that the preamble code information is not matched, the length of the first message sub-header is obtained according to the format of the first message sub-header, and then the starting position of the second message sub-header is learned, so as to continue to judge the second message sub-header.

For another example, for the arrangement manner of the first message shown in FIG. 13, the UE may first acquire the sub-head format indication information of the first message sub-header to obtain the format of the first message sub-header, and then acquire the preamble code information therein according to the format. In the case that the preamble code information is matched, the RAR sub-message corresponding to the first message sub-header is directly searched; in the case that the preamble code information is not matched, the length of the first message sub-header is obtained according to the format of the first message sub-header, and then the length of the first RAR sub-message is obtained according to the sub-message format indication information in the message sub-header, and then learns the starting position of the second message sub-header according to the above two lengths, so as to judge the second message sub-header.

Of course, it can be understood that, in the case that the UE needs to obtain the starting position according to the length each time, it will inevitably affect the speed of the UE decoding. Therefore, another embodiment of the present disclosure is provided.

For example, for acquiring the RAR sub-message, the concept of the message sub-load may be set, and the message sub-load carries the RAR sub-message. The length of each message sub-load is a fixed value, for example, 10 bits, and the formats of the RAR sub-messages carried in the message sub-load may be different, and the length thereof may also be different, which may be 4 bits, 6 bits or 8 bits, respectively. The RAR sub-messages in each sub-load are arranged in the first few bits, and the subsequent bits may be reserved. For example, the first 4 bits in 10 bits are RAR sub-messages, and the last 6 bits are reserved. The advantage of this is that the UE may know the starting position of each RAR sub-message as soon as receiving the RAR message, so that the UE does not need to acquire the format of the RAR sub-message corresponding to the sub-header to acquire the length of the RAR sub-message when determining that the current message sub-head does not match itself, and can directly jump to the start position of the next RAR sub-message to wait for the next judgment result, thereby reducing the workflow of the UE and improving the rate of decoding the RAR sub-message by the UE.

The above manner may also be applicable to the acquiring of sub-headers. That is, the concept of the sub-header field may be set, and the fixed length is also set. After determining a sub-header, the UE may directly jump to the starting position of the next sub-head according to the fixed length. Of course, this method may also be combined with the above manner of continuously obtaining the length. For example, the message sub-header is located in a fixed sub-header field, but the RAR sub-message does not need to be carried in a fixed sub-load, and this is not limited in the embodiment of the present disclosure.

In addition, it should be noted that, the message sub-header and the RAR sub-message in the first message received by the UE side may have a plurality of different implementation manners. For example, the Form at field in the message sub-header may be at least one bit. When the number of bits occupied by the fields are different, the R field, the Form at field and the RAPID field in the message sub-header may be arranged differently. For example, different RAR sub-message formats may be used according to different communication scenarios. For example, when the UE does not need to send uplink data, the received RAR sub-message may not include a UL grant field configured to indicate an uplink scheduling grant. In addition, the RAR sub-message that is written to the power control information may also be received, and the UE side may obtain the transmitting power of transmitting the uplink information sent by the network side after decoding the power control field, and send the uplink information in a preset transmitting power according to the instruction of the network side. Various implementations have been described in detail in the foregoing, which will not be further described herein.

The message sub-header and the RAR sub-message in the first message received by the UE side may also have different arrangements. For example, the first message includes a message header and a message payload, where the message header includes a plurality of message sub-headers arranged in a preset order, and the message payload includes a plurality of RAR sub-messages also arranged in the preset order. For another example, the first message includes a plurality of message units arranged in sequence, and each message unit includes a message sub-header and a RAR sub-message corresponding to the message sub-header. Similarly, various arrangements have been described in detail in the foregoing, which will not be described here.

In addition, in order to enable the UE to successfully decode the first message, before the first message is received, the UE side may negotiate with the network side to configure a correspondence between the RAR format indication information and the format of the RAR message. According to the preset format correspondence, the UE side may decode the RAR sub-message based on the correct format after acquiring the format indication information in the message sub-header.

For a more complete understanding of the method in the embodiment of the present disclosure, the complete interaction process of the network side device and the terminal device is described in detail in based on the method of transmitting the RAR message in the first aspect and the method of receiving the RAR message in the second aspect.

The entire interaction process may include the following steps:

S1: The network side device configures a format of a message sub-header in the first message to be delivered. Specifically, the number of bits occupied by the field in which the RAR format indication information is located may be configured, including the sub-message format indication information and the bit number of the sub-head format indication. Then, the correspondence between each type of RAR format indication information and each format of RAR message is configured. Finally, all the configuration results are sent to each UE;

S2: After receiving the configuration result, each UE stores the configuration result locally.

a RAP request is sent to the network side device, where the RAP request includes the sequence code of the UE, i.e., the preamble code, and also includes information indicating the purpose of the request, for example, the RAP request is for requesting an uplink synchronization or for requesting RRC re-establishment or the like;

S3. After receiving the RAP request reported by each UE, the network side device returns a first message to each UE. The first message includes sub-header format indication information of each sub-header, and each message header may further include a preamble code corresponding to the UE and a format type of the RAR sub-message.

Certainly, for some special communication scenarios, the network side device may also set the RAR sub-message corresponding to a certain UE as a RAR sub-message of a special format.

For example, when the RAP request reported by a certain UE is a request that does not need to request uplink resource allocation, the network side device may set the RAR sub-message corresponding to the UE to be an RAR sub-message that does not include an uplink grant field, and the format identifier corresponding to the special type of sub-message is carried in a message sub-header corresponding to the UE;

For example, when it is required to send certain control information to a certain UE, such as power control information, the network side device may also set the RAR sub-message corresponding to the UE to carry the power control information to be sent to the UE, that is, a part of a certain original field (e.g., the uplink grant field) is modified to be the power control field to carry the power control information. Similarly, the format identifier corresponding to the special type of sub-message needs to be carried in the message sub-head corresponding to the UE;

In addition, the arrangement manners of the message sub-headers and the RAR sub-messages in the first message sent by the network side device to each UE may be different. For example, in the manner shown in FIG. 12, all message sub-headers are arranged in the message header, and all RAR sub-messages are arranged in the message payload, and arrangement order of the message sub-headers correspond to that of RAR sub-messages. For the manner shown in FIG. 13, it may be arranged in the form of several message units, and each message unit includes a RAR message, that is, includes a message sub-header and a corresponding RAR sub-message.

S4: After receiving the first message sent by the network side device, the UE first obtains the format of the sub-header according to the sub-header format indication information, and then searches for the corresponding message sub-header according to the locally pre-stored preamble code.

In the case that a certain message sub-header matches the preamble code of the UE, the UE then acquires the format identifier according to the format of the pre-stored message sub-header, and obtains according to the format identifier the corresponding RAR sub-message format style stored locally to decode the RAR sub-message corresponding to the sub-header.

For some special communication scenarios, the UE may also perform some special operations according to the RAR sub-message of a special format.

For example, when the RAR sub-message decoded by a certain UE does not include the uplink grant field, the UE may not need to report the uplink data to the network side device in the next step; for example, when the RAR sub-message decoded by a certain UE includes power control field, the transmitting power of the uplink data may be adjusted according to the power control information in the power control field.

Through the interaction of the above four steps, the network side device only needs to send one first message to each UE and then each UE may correctly receive and decode the respective RAR sub-message. In some special scenarios, the UE receives the RAR sub-message that does not include the uplink grant field, and does not need to report the uplink data without substantial content. The network-side device may also carry the necessary UE control information in the RAR sub-message, and does not need to send the control information of the UE separately Therefore, the method of transmitting the RAR message and the method of receiving the RAR message in some embodiments of the present disclosure may reduce the interaction process from the network side device and the terminal device, and may effectively improve the resource utilization of the air interface compared to the sending and receiving mode in the related art. In addition, the method in some embodiments of the present disclosure may be applied to systems such as 5G systems and LTE system, and has a wide applicability.

Figure 16:
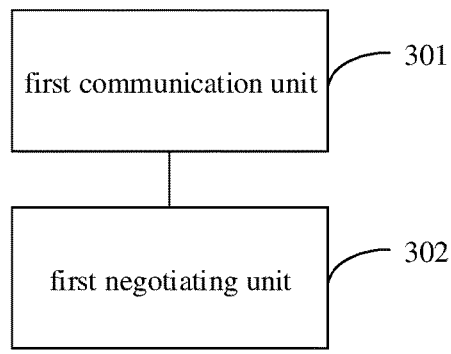
FIG. 16 is a schematic view of a RAR message sending device in some embodiments of the present disclosure.

In a third aspect, a device of transmitting a random access response message is provided in some embodiments of the present disclosure. As shown in FIG. 16, the device includes:

a first communication unit, configured to receive a random access request sent by a UE, and returning a first message to the UE, where the first message carries a random access response (RAR) message and RAR format indication information, the RAR format indication information is at least partially set in the RAR message, or the RAR format indication information is entirely set outside the RAR message; the RAR format indication information is configured to indicate a format of the RAR message.

Optionally, the RAR message includes a RAR sub-message, and the RAR format indication information includes sub-message format indication information configured to indicate a format of the RAR sub-message.

Optionally, the RAR message further includes a message sub-header corresponding to the RAR sub-message, and the sub-message format indication information is carried in the message sub-header.

Optionally, the RAR message includes a message sub-header and a corresponding RAR sub-message, where the RAR format indication information includes sub-header format indication information configured to indicate a format of the message sub-header.

Optionally, the random access request sent by the UE includes a preamble code reported by the UE;

the message sub-header further includes information of at least one preamble code, the information of the preamble code is the preamble code or an identifier of the preamble code.

Optionally, the first message includes a message header and a message payload, where the message header includes a plurality of message sub-headers arranged in a preset order, the message payload includes a plurality of RAR sub-messages arranged in the preset order.

Optionally, the first message includes a plurality of message units arranged in sequence, each message unit includes the message sub-header and the RAR sub-message corresponding to the message sub-header.

Optionally, the first communication unit is further configured to:

in the case that it is determined based on the random access request sent by the UE that a random access of the UE does not require an uplink grant, not carry an uplink grant resource in the RAR sub-message corresponding to the UE.

Optionally, the first communication unit is further configured to:

carry power control information in the RAR sub-message, where the power control information is configured to enable the UE to acquire, based on the power control information, a transmitting power of transmitting uplink information.

Optionally, the power control information carries an absolute value of power or a power change value relative to the transmitting power of reporting the random access request by the UE.

Optionally, the device further includes:

a first negotiating unit, configured to negotiate with the UE to configure a correspondence between the RAR format indication information and the format of the RAR message.

The device of transmitting a random access response in some embodiments of the present disclosure is able to perform the method of transmitting a random access response in some embodiments of the present disclosure, therefore a person skilled in the art may understand the specific implementation manner of the device of transmitting the random access response in the present embodiment and various changes thereof, so how the device implements the method of transmitting the random access response in the embodiment of the present disclosure will not be described again. The device used by the person skilled in the art to implement the method in the embodiments of the present disclosure is within the scope of the present disclosure.

Figure 17:
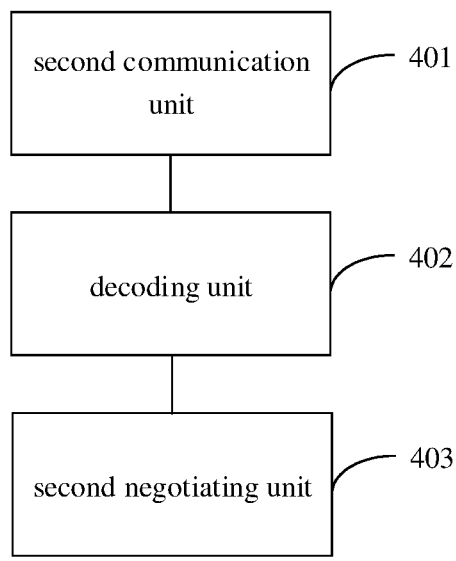
FIG. 17 is a schematic view of an RAR message device in some embodiments of the present disclosure.

In a sixth aspect, a device of receiving a random access response message is provided in some embodiments of the present disclosure. As shown in FIG. 17, the device includes:

a second communication unit, configured to receive a first message returned by a network side after sending a random access request, where the first message carries a random access response (RAR) message and RAR format indication information, the RAR format indication information is at least partially set in the RAR message, or the RAR format indication information is entirely set outside the RAR message, and the RAR format indication information is configured to indicate a format of the RAR message; and a decoding unit, configured to decode the RAR message based on a format indicated by the RAR format indication information.

Optionally, the RAR message includes a RAR sub-message, and the RAR format indication information includes sub-message format indication information configured to indicate a format of the RAR sub-message, the decoding unit is further configured to decode the RAR sub-message based on a format indicated by the sub-message format indication information.

Optionally, the RAR message further includes a message sub-header corresponding to the RAR sub-message, and the sub-message format indication information is carried in the message sub-header.

Optionally, the random access request sent by the UE includes a preamble code reported by the UE;

the message sub-header further includes information of at least one preamble code, the information of the preamble code is the preamble code or an identifier of the preamble code.

Optionally, the decoding unit is further configured to:

acquire the preamble code in the message sub-header;

in the case that the information of the preamble code is matched with the preamble code used in sending the random access request, decode the RAR sub-message based on the format indicated by the sub-message format indication information in the message sub-header;

in the case that the information of the preamble code is not matched with the preamble code used in sending the random access request, acquire a length of the RAR sub-message based on the sub-message format indication information in the message sub-header, acquire a starting position of the next RAR sub-message based on the length, and judge the information of the preamble code in the next message sub-header.

Optionally, the RAR message includes a message sub-header and a corresponding RAR sub-message, where the RAR format indication information includes sub-header format indication information configured to indicate a format of the message sub-header;

the decoding unit is further configured to:

decode the message sub-header based on a format indicated by the sub-header format indication information.

Optionally, the first message includes a message header and a message payload, where the message header includes a plurality of message sub-headers arranged in a preset order, the message payload includes a plurality of RAR sub-messages arranged in the preset order.

Optionally, the first message includes a plurality of message units arranged in sequence, each message unit includes the message sub-header and the RAR sub-message corresponding to the message sub-header.

In the case that the decoded RAR sub-message carries power control information, a transmitting power of transmitting uplink information is acquire based on the power control information.

Optionally, the power control information carries an absolute value of power or a power change value relative to the transmitting power of reporting the random access request by the UE.

Optionally, a correspondence between the RAR format indication information and the format of the RAR message is configured by negotiating with the network side.

The device of receiving a random access response in some embodiments of the present disclosure is able to perform the method of receiving a random access response in some embodiments of the present disclosure, therefore a person skilled in the art may understand the specific implementation manner of the device of receiving the random access response in the present embodiment and various changes thereof, so how the device implements the method of receiving the random access response in the embodiment of the present disclosure will not be described again. The device used by the person skilled in the art to implement the method in the embodiments of the present disclosure is within the scope of the present disclosure.

Figure 18:
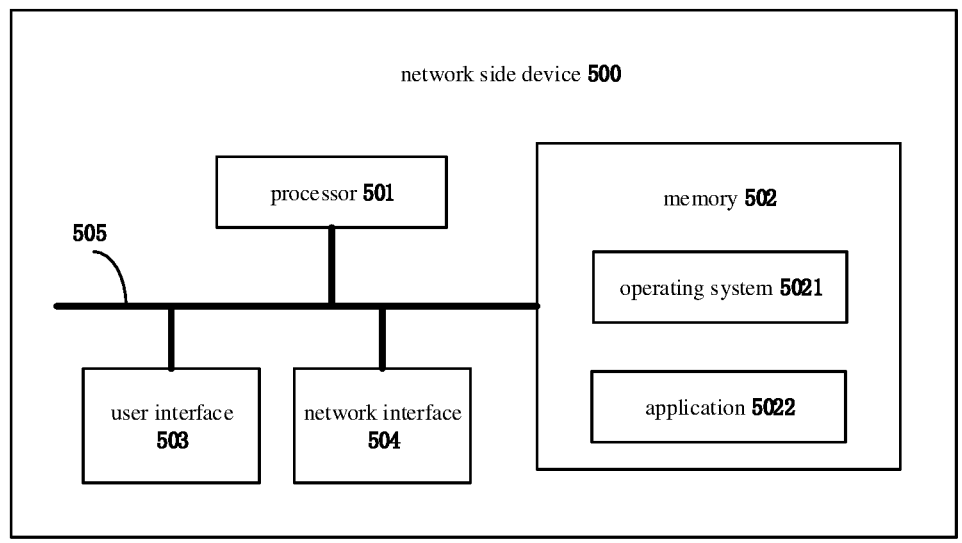
FIG. 18 is a schematic view of a network side device in some embodiments of the present disclosure.

FIG. 18 is a block diagram of a network side device of another embodiment of the present disclosure. The network side device 500 shown in FIG. 18 includes at least one processor 501, a memory 502, at least one network interface 504, and other user interfaces 503. The various components in network side device 500 are coupled together by bus system 505. It will be appreciated that bus system 505 is used to implement connection communication between these components. The bus system 505 includes a power bus, a control bus, and a status signal bus in addition to the data bus. However, for clarity of description, various buses are labeled as bus system 505 in FIG. 18.

The user interface 503 may include a display, a keyboard, or a pointing device (e.g., a mouse, a trackball, a touchpad, or a touch screen, etc.).

It is to be understood that the memory 502 in the embodiments of the present disclosure may be a volatile memory or a non-volatile memory, or may include both volatile and non-volatile memory. The non-volatile memory may be a read-only memory (ROM), a programmable read only memory (PROM), an erasable programmable read only memory (Erasable PROM, EPROM), or an electric Erase programmable read only memory (EEPROM) or flash memory. The volatile memory can be a Random Access Memory (RAM) that acts as an external cache. By way of example and not limitation, many forms of RAM are available, such as static random access memory (SRAM), dynamic random access memory (DRAM), synchronous dynamic random access memory (Synchronous DRAM). SDRAM), Double Data Rate SDRAM (DDRSDRAM), Enhanced Synchronous Dynamic Random Access Memory (ESDRAM), Synchronous Connection Dynamic Random Access Memory (SDRAM) and Direct memory bus random access memory (Direct Rambus RAM, DRRAM). Memory 502 of the systems and methods described herein is intended to comprise, without being limited to, these and any other suitable types of memory.

In some implementations, memory 502 stores elements, executable modules or data structures, or a subset thereof, or their extended set: operating system 5021 and application 5022.

The operating system 5021 includes various system programs, such as a framework layer, a core library layer, a driver layer, and the like, for implementing various basic services and processing hardware-based tasks. The application 5022 includes various applications, such as a media player, a browser (Browser), etc., for implementing various application services. A program implementing the method of the embodiment of the present disclosure may be included in the application 5022.

In the embodiment of the present disclosure, the program or the instruction stored in the memory 502 is specifically a program or an instruction stored in the application 5022, and the processor 501 is configured to receive a random access request sent by the UE to the UE and return a first message, where the first message carries a random access response (RAR) message and RAR format indication information, the RAR format indication information is at least partially set in the RAR message, or the RAR format indication information is entirely set outside the RAR message; the RAR format indication information is configured to indicate a format of the RAR message.

The method disclosed in the foregoing embodiments of the present disclosure may be applied to the processor 501 or implemented by the processor 501. Processor 501 may be an integrated circuit chip with signal processing capabilities. In the implementation process, each step of the foregoing method may be completed by an integrated logic circuit of hardware in the processor 501 or an instruction in a form of software. The processor 501 may be a general-purpose processor, a digital signal processor (DSP), an application specific integrated circuit (ASIC), a Field Programmable Gate Array (FPGA), or the like. Programming logic devices, discrete gates or transistor logic devices, discrete hardware components. The methods, steps, and logical block diagrams disclosed in the embodiments of the present disclosure may be implemented or carried out. The general purpose processor may be a microprocessor or the processor or any conventional processor or the like. The steps of the method disclosed in the embodiments of the present disclosure may be directly implemented by the hardware decoding processor, or may be performed by a combination of hardware and software modules in the decoding processor. The software module can be located in a conventional storage medium such as random access memory, flash memory, read only memory, programmable read only memory or electrically erasable programmable memory, registers, and the like. The storage medium is located in the memory 502, and the processor 501 reads the information in the memory 502 and completes the steps of the above method in combination with its hardware.

It will be appreciated that the embodiments described herein can be implemented in hardware, software, firmware, middleware, microcode, or a combination thereof. For hardware implementation, the processing unit can be implemented in one or more Application Specific Integrated Circuits (ASICs), Digital Signal Processing (DSP), Digital Signal Processing Equipment (DSP Device, DSPD), programmable logic. Programmable Logic Device (PLD), Field-Programmable Gate Array (FPGA), general purpose processor, controller, microcontroller, microprocessor, other electronic unit for performing the functions described herein Or a combination thereof.

For a software implementation, the techniques described herein can be implemented by modules (e.g., procedures, functions, and so on) that perform the functions described herein. The software code can be stored in memory and executed by the processor. The memory can be implemented in the processor or external to the processor.

Optionally, the RAR message includes a RAR sub-message, and the RAR format indication information includes sub-message format indication information configured to indicate a format of the RAR sub-message.

Optionally, the RAR message further includes a message sub-header corresponding to the RAR sub-message, and the sub-message format indication information is carried in the message sub-header.

Optionally, the RAR message includes a message sub-header and a corresponding RAR sub-message, where the RAR format indication information includes sub-header format indication information configured to indicate a format of the message sub-header.

Optionally, the random access request sent by the UE includes a preamble code reported by the UE, and the message sub-header further includes information of at least one preamble code, the information of the preamble code is the preamble code or an identifier of the preamble code.

Optionally, the first message includes a message header and a message payload, where the message header includes a plurality of message sub-headers arranged in a preset order, the message payload includes a plurality of RAR sub-messages arranged in the preset order.

Optionally, the first message includes a plurality of message units arranged in sequence, each message unit includes the message sub-header and the RAR sub-message corresponding to the message sub-header.

Optionally, the method further includes:
in the case that it is determined based on the random access request sent by the UE that a random access of the UE does not require an uplink grant, not carrying an uplink grant resource in the RAR sub-message corresponding to the UE.

Optionally, the method further includes:
carrying power control information in the RAR sub-message, where the power control information is configured to enable the UE to acquire, based on the power control information, a transmitting power of transmitting uplink information.

Optionally, the method further includes the power control information carries an absolute value of power or a power change value relative to the transmitting power of reporting the random access request by the UE.

Optionally, the method further includes:
negotiating with the UE to configure a correspondence between the RAR format indication information and the format of the RAR message.

The network side device 500 may implement various processes implemented by the network side device in the foregoing embodiment. To avoid repetition, details are not described herein again.

According to the embodiments of the present disclosure, the network side device, after receiving the RAP request sent by the UE, may send a first message to the UE, where the first message includes RAR format indication information configured to indicate the format of the corresponding RAR message, to enable the UE, after receiving the RAR message, to decode and identify the RAR message according to the format indicated by the RAR message format indication information. Compared with the RAR message sending method in the related art, the sent message in the embodiment of the present disclosure includes indication information indicating the format of each RAR message, and when it is used in the scenario that the RAR messages are sent to a plurality of UEs at the same time, the UE is able to decode and identify the RAR messages successfully and the RAR messages of different formats may be integrated into a single message and delivered to each UE, thereby effectively reducing the workload of the base station side and saving air interface resources.

Figure 19:
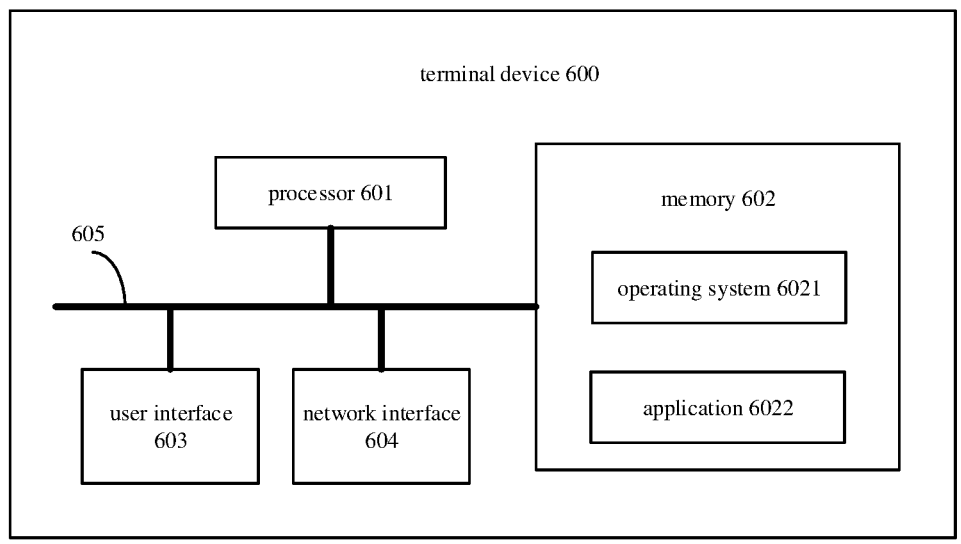
FIG. 19 is a schematic view of a terminal device in some embodiments of the present disclosure.

FIG. 19 is a block diagram of a terminal device of another embodiment of the present disclosure. The terminal device 600 shown in FIG. 19 includes at least one processor 601, a memory 602, at least one network interface 604, and other user interfaces 603. The various components in terminal device 600 are coupled together by a bus system 605. It will be appreciated that the bus system 605 is used to implement connection communication between these components. The bus system 605 includes a power bus, a control bus, and a status signal bus in addition to the data bus. However, for clarity of description, various buses are labeled as bus system 605 in FIG.

The user interface 603 may include a display, a keyboard, or a pointing device (e.g., a mouse, a trackball, a touchpad, or a touch screen, etc.).

It is to be understood that the memory 602 in the embodiments of the present disclosure may be a volatile memory or a non-volatile memory, or may include both volatile and non-volatile memory. The non-volatile memory may be a read-only memory (ROM), a programmable read only memory (PROM), an erasable programmable read only memory (Erasable PROM, EPROM), or an electric Erase programmable read only memory (EEPROM) or flash memory. The volatile memory can be a Random Access Memory (RAM) that acts as an external cache. By way of example and not limitation, many forms of RAM are available, such as static random access memory (SRAM), dynamic random access memory (DRAM), synchronous dynamic random access memory (Synchronous DRAM). SDRAM), Double Data Rate SDRAM (DDRSDRAM), Enhanced Synchronous Dynamic Random Access Memory (ESDRAM), Synchronous Connection Dynamic Random Access Memory (SDRAM) and direct memory bus random access memory (Direct Rambus RAM, DRRAM). The memory 602 of the systems and methods described herein is intended to comprise, without being limited to, these and any other suitable types of memory.

In some implementations, memory 602 stores elements, executable modules or data structures, or a subset thereof, or their set of extensions: operating system 6021 and application 6022.

The operating system 6021 includes various system programs, such as a framework layer, a core library layer, a driver layer, and the like, for implementing various basic services and processing hardware-based tasks. The application 6022 includes various applications, such as a media player (Media Player), a browser, and the like, for implementing various application services. A program implementing the method of the embodiment of the present disclosure may be included in the application 6022.

In the embodiment of the present disclosure, the program or the instruction stored in the memory 602 is specifically a program or an instruction stored in the application 6022. The process 601 is configured to: receive a first message returned by a network side after sending a random access request, where the first message carries a random access response (RAR) message and RAR format indication information, the RAR format indication information is at least partially set in the RAR message, or the RAR format indication information is entirely set outside the RAR message, and the RAR format indication information is configured to indicate a format of the RAR message; and decode the RAR message based on a format indicated by the RAR format indication information.

The method disclosed in the foregoing embodiments of the present disclosure may be applied to the processor 601 or implemented by the processor 601. Processor 601 may be an integrated circuit chip with signal processing capabilities. In the implementation process, each step of the foregoing method may be completed by an integrated logic circuit of hardware in the processor 601 or an instruction in a form of software. The processor 601 may be a general-purpose processor, a digital signal processor (DSP), an application specific integrated circuit (ASIC), a field programmable gate array (FPGA), or the like. Programming logic devices, discrete gates or transistor logic devices, discrete hardware components. The methods, steps, and logical block diagrams disclosed in the embodiments of the present disclosure may be implemented or carried out. The general purpose processor may be a microprocessor or the processor or any conventional processor or the like. The steps of the method disclosed in the embodiments of the present disclosure may be directly implemented by the hardware decoding processor, or may be performed by a combination of hardware and software modules in the decoding processor. The software module can be located in a conventional storage medium such as random access memory, flash memory, read only memory, programmable read only memory or electrically erasable programmable memory, registers, and the like. The storage medium is located in the memory 602, and the processor 601 reads the information in the memory 602 and completes the steps of the above method in combination with its hardware.

It will be appreciated that the embodiments described herein can be implemented in hardware, software, firmware, middleware, microcode, or a combination thereof. For hardware implementation, the processing unit can be implemented in one or more Application Specific Integrated Circuits (ASICs), Digital Signal Processing (DSP), Digital Signal Processing Equipment (DSP Device, DSPD), programmable logic. Programmable Logic Device (PLD), Field-Programmable Gate Array (FPGA), general purpose processor, controller, microcontroller, microprocessor, other electronic unit for performing the functions described herein or a combination thereof.

For a software implementation, the techniques described herein can be implemented by modules (e.g., procedures, functions, and so on) that perform the functions described herein. The software code can be stored in memory and executed by the processor. The memory can be implemented in the processor or external to the processor.

Optionally, the RAR message includes a RAR sub-message, and the RAR format indication information includes sub-message format indication information configured to indicate a format of the RAR sub-message, where the decoding the RAR message based on the format indicated by the RAR format indication information includes:

decoding the RAR sub-message based on a format indicated by the sub-message format indication information.

Optionally, the RAR message further includes a message sub-header corresponding to the RAR sub-message, and the sub-message format indication information is carried in the message sub-header.

Optionally, the random access request sent by the UE includes a preamble code reported by the UE, and the message sub-header further includes information of at least one preamble code, the information of the preamble code is the preamble code or an identifier of the preamble code.

Optionally, the decoding the RAR sub-message based on the format indicated by the sub-message format indication information includes:

acquiring the preamble code in the message sub-header;

in the case that the information of the preamble code is matched with the preamble code used in sending the random access request, decoding the RAR sub-message based on the format indicated by the sub-message format indication information in the message sub-header;

in the case that the information of the preamble code is not matched with the preamble code used in sending the random access request, acquiring a length of the RAR sub-message based on the sub-message format indication information in the message sub-header, acquiring a starting position of the next RAR sub-message based on the length, and judging the information of the preamble code in the next message sub-header.

Optionally, the RAR message includes a message sub-header and a corresponding RAR sub-message, where the RAR format indication information includes sub-header format indication information configured to indicate a format of the message sub-header, the RAR format indication information is configured to indicate a format of the RAR message, including:

decoding the message sub-header based on a format indicated by the sub-header format indication information.

Optionally, the first message includes a message header and a message payload, where the message header includes a plurality of message sub-headers arranged in a preset order, the message payload includes a plurality of RAR sub-messages arranged in the preset order.

Optionally, the first message includes a plurality of message units arranged in sequence, each message unit includes the message sub-header and the RAR sub-message corresponding to the message sub-header.

Optionally, the method further includes:

in the case that the decoded RAR sub-message carries power control information, acquiring, based on the power control information, a transmitting power of transmitting uplink information.

Optionally, the power control information carries an absolute value of power or a power change value relative to the transmitting power of reporting the random access request by the UE.

Optionally, the method further includes:

negotiating with the network side to configure a correspondence between the RAR format indication information and the format of the RAR message.

The terminal device 600 can implement various processes implemented by the terminal device in the foregoing embodiment. To avoid repetition, details are not described herein again.

Those of ordinary skill in the art will appreciate that the elements and algorithm steps of the various examples described in connection with the embodiments disclosed herein can be implemented in electronic hardware or a combination of computer software and electronic hardware. Whether these functions are performed in hardware or software depends on the specific application and design constraints of the solution. A person skilled in the art can use different methods for implementing the described functions for each particular application, but such implementation should not be considered to be beyond the scope of the present disclosure.

A person skilled in the art can clearly understand that for the convenience and brevity of the description, the specific working process of the system, the device and the unit described above can refer to the corresponding process in the foregoing method embodiment, and details are not described herein again.

In the embodiments provided by the present application, it should be understood that the disclosed apparatus and method may be implemented in other manners. For example, the device embodiments described above are merely illustrative. For example, the division of the unit is only a logical function division. In actual implementation, there may be another division manner, for example, a plurality of units or components may be combined or can be integrated into another system, or some features can be ignored or not executed. In addition, the mutual coupling or direct coupling or communication connection shown or discussed may be an indirect coupling or communication connection through some interface, device or unit, and may be in an electrical, mechanical or other form.

The units described as separate components may or may not be physically separated, and the components displayed as units may or may not be physical units, that is, may be located in one place, or may be distributed to a plurality of network units. Some or all of the units may be selected according to actual needs to achieve the purpose of the solution of the embodiment.

In addition, each functional unit in each embodiment of the present disclosure may be integrated into one processing unit, or each unit may exist physically separately, or two or more units may be integrated into one unit.

The functions may be stored in a computer-readable storage medium in the case that implemented in the form of a software functional unit and sold or used as a standalone product. Based on such understanding, the technical solution of the present disclosure, which is essential or contributes to the prior art, or a part of the technical solution, may be embodied in the form of a software product, which is stored in a storage medium, including The instructions are used to cause a computer device (which may be a personal computer, server, or network device, etc.) to perform all or part of the steps of the methods described in various embodiments of the present disclosure. The foregoing storage medium includes various media that can store program codes, such as a USB flash drive, a mobile hard disk, a ROM, a RAM, a magnetic disk, or an optical disk.

The above are only some embodiments of the present disclosure, but the scope of the present disclosure is not limited thereto, and any person skilled in the art may easily think of changes or substitutions within the technical scope of the present disclosure. It should be covered by the scope of the present disclosure. Therefore, the scope of the present disclosure should be determined by the scope of the claims.

What is claimed is:

1. A method of transmitting a random access response message, comprising:
   receiving a random access request sent by a User Equipment (UE), and returning a first message to the UE, wherein the first message consists of a plurality of message units arranged in sequence, each message unit comprising a message sub-header and a RAR sub-message corresponding to the message sub-header, wherein the message sub-header comprises sub-message format indication information configured to indicate a format of the RAR sub-message,
   wherein the random access request sent by the UE comprises a preamble code reported by the UE, and the message sub-header further comprises information of at least one preamble code, the information of the preamble code is the preamble code.

2. The method according to claim 1, further comprising:
   in the case that it is determined based on the random access request sent by the UE that a random access of the UE does not require an uplink grant, not carrying an uplink grant resource in the RAR sub-message corresponding to the UE.

3. The method according to claim 1, further comprising:
   carrying power control information in the RAR sub-message, wherein the power control information is configured to enable the UE to acquire, based on the power control information, a transmitting power of transmitting uplink information.

4. The method according to claim 3, wherein the power control information carries an absolute value of power or a power change value relative to the transmitting power of reporting the random access request by the UE.

5. The method according to claim 1, further comprising: negotiating with the UE to configure a correspondence between RAR format indication information and a format of the RAR message.

6. A method of receiving a random access response message, comprising:
receiving, by a User Equipment (UE), a first message returned by a network side after sending a random access request, wherein the first message consists of a plurality of message units arranged in sequence, each message unit comprising a message sub-header and a RAR sub-message corresponding to the message sub-header, wherein the message sub-header comprises sub-message format indication information configured to indicate a format of the RAR sub-message; and
decoding, by the UE, the RAR sub-message based on the format indicated by the sub-message format indication information;
wherein the random access request sent by the UE comprises a preamble code reported by the UE, and the message sub-header further comprises information of at least one preamble code, the information of the preamble code is the preamble code.

7. The method according to claim 6, wherein
wherein the decoding the RAR sub-message based on the format indicated by the sub-message format indication information comprises:
acquiring the preamble code in the message sub-header;
in the case that the information of the preamble code is matched with the preamble code used in sending the random access request, decoding the RAR sub-message based on the format indicated by the sub-message format indication information in the message sub-header;
in the case that the information of the preamble code is not matched with the preamble code used in sending the random access request, acquiring a length of the RAR sub-message based on the sub-message format indication information in the message sub-header, acquiring a starting position of the next RAR sub-message based on the length, and judging the information of the preamble code in the next message sub-header.

8. The method according to claim 6, wherein the RAR message comprises a message sub-header and a corresponding RAR sub-message, wherein RAR format indication information comprises sub-header format indication information configured to indicate a format of the message sub-header, the RAR format indication information is configured to indicate a format of the RAR message, comprising:
decoding the message sub-header based on a format indicated by the sub-header format indication information.

9. The method according to claim 6, wherein the first message comprises a message header and a message payload, wherein the message header comprises a plurality of message sub-headers arranged in a preset order, the message payload comprises a plurality of RAR sub-messages arranged in the preset order.

10. The method according to claim 6, further comprising:
in the case that the decoded RAR sub-message carries power control information, acquiring, based on the power control information, a transmitting power of transmitting uplink information.

11. The method according to claim 10, wherein the power control information carries an absolute value of power or a power change value relative to the transmitting power of reporting the random access request by the UE.

12. The method according to claim 6, further comprising:
negotiating with the network side to configure a correspondence between RAR format indication information and a format of the RAR message.

13. A device of transmitting a random access response message, comprising: a memory, a processor and a computer program stored in the memory and executable by the processor, wherein the processor executes the computer program to perform the method of transmitting a random access response message according to claim 1.

14. A device of receiving a random access response message, comprising: a memory, a processor and a computer program stored in the memory and executable by the processor, wherein the processor executes the computer program to:
receive a first message returned by a network side after sending a random access request, wherein the first message consists of a plurality of message units arranged in sequence, each message unit comprising a message sub-header and a RAR sub-message corresponding to the message sub-header, wherein the message sub-header comprises sub-message format indication information configured to indicate a format of the RAR sub-message; and
decode the RAR sub-message based on the format indicated by the sub-message format indication information;
wherein the random access request sent to the network side comprises a preamble code reported to the network side, and the message sub-header further comprises information of at least one preamble code, the information of the preamble code is the preamble code.

15. The device of receiving a random access response message according to claim 14,
wherein the processor executes the computer program to:
acquire the preamble code in the message sub-header;
in the case that the information of the preamble code is matched with the preamble code used in sending the random access request, decode the RAR sub-message based on the format indicated by the sub-message format indication information in the message sub-header;
in the case that the information of the preamble code is not matched with the preamble code used in sending the random access request, acquire a length of the RAR sub-message based on the sub-message format indication information in the message sub-header, acquire a starting position of the next RAR sub-message based on the length, and judge the information of the preamble code in the next message sub-header.

16. The device of receiving a random access response message according to claim 14, wherein the RAR message comprises a message sub-header and a corresponding RAR sub-message, wherein the processor executes the computer program to:
decode the message sub-header based on a format indicated by sub-header format indication information.

17. The device of receiving a random access response message according to claim 14, wherein the first message comprises a message header and a message payload, wherein the message header comprises a plurality of message sub-headers arranged in a preset order, the message payload comprises a plurality of RAR sub-messages arranged in the preset order.

18. The device of receiving a random access response message according to claim 14, wherein the processor executes the computer program to:

in the case that the decoded RAR sub-message carries power control information, acquire, based on the power control information, a transmitting power of transmitting uplink information.

19. The device of receiving a random access response message according to claim 18, wherein the power control information carries an absolute value of power or a power change value relative to the transmitting power of reporting the random access request by the UE.

* * * * *